(12) United States Patent
Akiyama

(10) Patent No.: US 7,150,535 B2
(45) Date of Patent: Dec. 19, 2006

(54) LIGHTING DEVICE AND PROJECTOR EQUIPPED WITH THE SAME

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 96 days.

(21) Appl. No.: 10/957,673

(22) Filed: Oct. 5, 2004

(65) Prior Publication Data
US 2005/0157268 A1 Jul. 21, 2005

(30) Foreign Application Priority Data
Oct. 7, 2003 (JP) ............................. 2003-348417

(51) Int. Cl.
G03B 21/14 (2006.01)
G03B 21/20 (2006.01)
(52) U.S. Cl. ........................ 353/38; 353/102
(58) Field of Classification Search ................. 353/20, 353/30, 31, 38, 100, 102
See application file for complete search history.

(56) References Cited

U.S. PATENT DOCUMENTS

| | | | |
|---|---|---|---|
| 6,046,856 A | 4/2000 | Takahashi et al. | |
| 6,283,615 B1 | 9/2001 | Takahashi | |
| 6,431,727 B1 * | 8/2002 | Sugawara et al. | 362/244 |
| 6,486,997 B1 * | 11/2002 | Bruzzone et al. | 359/247 |
| 2002/0018184 A1 * | 2/2002 | Ito | 353/30 |
| 2004/0046942 A1 * | 3/2004 | Katsumata et al. | 353/53 |
| 2005/0041215 A1 * | 2/2005 | Fujimori | 353/38 |

FOREIGN PATENT DOCUMENTS

| | | |
|---|---|---|
| EP | 0 395 156 A | 10/1990 |
| JP | A 3-111806 | 5/1991 |
| JP | A 7-174974 | 7/1995 |
| JP | A 2000-298310 | 10/2000 |
| JP | A 2000-347293 | 12/2000 |
| JP | A 2002-244199 | 8/2002 |
| WO | WO 02/088842 A1 | 11/2002 |

OTHER PUBLICATIONS

H. Moench et al., "9.1: Arc Stabilisation for Short Arc Projection Lamps," *SID 00 Digest*, vol. XXXI, 2000, pp. 84-87, XP007007334.

* cited by examiner

*Primary Examiner*—Melissa Jan Koval
*Assistant Examiner*—Andrew Kong
(74) *Attorney, Agent, or Firm*—Oliff & Berridge, PLC

(57) ABSTRACT

A lighting includes: a light source device; a concave lens having a light-incident surface formed from a hyperboloid of revolution to make the luminous flux from the light source device almost parallel; a first lens array; and a second lens array, with a concave surface is present between the light-incident surface of the concave lens and the first lens array, and the concave surface causes, together with the light-incident surface of the concave lens, the luminous flux to travel along an optical path heading to an outer side rather than an optical path parallel to an optical axis of the light source device, while causing the luminous flux to pass through the small lenses that correspond to each other in the first lens array and the second lens array.

10 Claims, 8 Drawing Sheets

LIGHTING DEVICE AND PROJECTOR EQUIPPED WITH THE SAME

BACKGROUND

Exemplary aspects of the present invention relate to a lighting device and a projector equipped with the same.

Related art projectors include a lighting device that emits illuminating light, an electro-optic modulating device that modulates illuminating light from the lighting device according to an image signal, and a projection lens used to project modulated light from the electro-optic modulating device for an image to be displayed.

A projector configured in this manner may have a projection image on display having almost homogeneous luminance distributions, a lighting device employing a so-called integrator optical system capable of irradiating an illuminated region where an image is to be formed with almost homogeneous light intensity distributions is used as the lighting device.

FIG. 7 is a schematic showing a related art lighting device when viewed from above. FIG. 8 is a schematic of a first lens array when viewed along a light-source optical axis. As is shown in FIG. 7, a related art lighting device 800 includes a light source device 810 having a light-emitting tube 820 and an ellipsoidal reflector 830, a collimator lens 840, a first lens array 850, a second lens array 860, and a superimposing lens 870. LA denotes an illuminated region in a liquid crystal device or the like.

Respective optical components are disposed in reference to a light-source optical axis 810$ax$ (the central axis of a luminous flux emitted from the light source device 810). Specifically, the first lens array 850, the second lens array 860, and the superimposing lens 870 are disposed in such a manner that their centers almost agree with the light-source optical axis 810$ax$ and become almost perpendicular to the light-source optical axis 810$ax$.

In the related art lighting device 800 configured in this manner, the light-emitting tube 820 includes a light-emitting portion (arc) having a predetermined length in the direction of the light-source optical axis 810$ax$, and the center of the light-emitting portion is disposed in close proximity to the position of a focal point (first focal point) $F_1$, which is one of two focal points of the ellipsoidal reflector 830 on the light-source optical axis 810$ax$ closer to the ellipsoidal reflector 830. Light emitted from the light-emitting portion is reflected on a reflection surface 830R of the ellipsoidal reflector 830, and the reflection light goes incident on the first lens array 850 after it is changed to an illuminating luminous flux almost parallel to the light-source optical axis 810$ax$ by the collimator lens 840 while traveling to the other focal point (second focal point) $F_2$ farther from the ellipsoidal reflector 830.

As is shown in FIG. 8, the first lens array 850 includes a matrix (in this case, 10 rows×6 columns) of plural small lenses 852, each having a rectangular contour almost analogous to the shape of the illuminated region LA, and divides an almost parallel illuminating luminous flux from the light source device 810 into plural partial luminous fluxes by the plural small lenses 852. As with the first lens array 850, the second lens array 860 also includes a matrix of plural small lenses 862, each having a rectangular contour. The small lenses 862 in the second lens array 860 are aligned in correspondence with the small lenses 852 in the first lens array 850. Plural partial luminous fluxes emitted from the small lenses 852 in the first lens array 850 are thus condensed independently on the corresponding small lenses 862. Respective plural partial luminous fluxes emitted from the respective small lenses 862 in the second lens array 860 are then superimposed by the superimposing lens 870 to illuminate the illuminated region LA in the liquid crystal device or the like.

In the related art lighting device 800, when the parallelism of a luminous flux emitted from the light source device 810 is insufficient, the luminous flux is not able to pass through the small lenses 852 and 862 that correspond to each other in the first lens array 850 and the second lens array 860, respectively. Such being the case, the inventor has previously disclosed a technique to enhance the parallelism of a luminous flux emitted from the light source device 810 (for example, see JP-A-2000-347293).

A lighting device including the integrator optical system of this kind includes a type that uses a parabolic reflector capable of making light from the light-emitting tube parallel upon reflection, besides a type that makes light from the light-emitting tube parallel by combining the ellipsoidal reflector and the collimator lens as described above.

FIG. 9 is a schematic used to explain a problem with a lighting device using a parabolic reflector. For a lighting device using a parabolic reflector 880, as is shown in FIG. 9, in the case of a reflection surface 880R including a paraboloid of revolution of the parabolic reflector 880, an angle of incorporation (an angle about the light-source optical axis 810$ax$), θ, needed to guide radially emitted light from the light-emitting tube 820 to the collimator lens 840 becomes smaller than in the case of a reflection surface 830R including an ellipsoid of revolution of the ellipsoidal reflector 830. The lighting device using the parabolic reflector 880 therefore has a problem that efficiency of light utilization is lower than the lighting device using the ellipsoidal reflector 830. With this being the situation, a lighting device adopting an ellipsoidal reflector has been developed actively in recent years.

The lighting device using such an ellipsoidal reflector, however, has inhomogeneous light intensity distributions, and the distributions tend to be biased toward the light-source optical axis, which results in problems as follows.

FIG. 10 is a schematic showing loci of light in a lighting device in the related art using an ellipsoidal reflector. FIGS. 11(a) and 11(b) are schematics used to explain are images on the second lens array. FIG. 11(a) is a schematic showing are images when formed ideally on the second lens array, and FIG. 11(b) is a schematic showing arc images actually formed on the second lens array. As is shown in FIG. 11, the related art lighting device 800 using the ellipsoidal reflector 830 has illuminance distributions such that illuminance is high in the vicinity of the light-source optical axis 810$ax$ and illuminance becomes lower with distances from the light-source optical axis 810$ax$. Hence, as is shown in FIGS. 11(a) and 11(b), the are images 864 formed on the second lens array 860, which are supposed to be fit within respective small lenses 862 as is shown in FIG. 11(a), are biased toward the proximity to the light-source optical axis 810$ax$ as is shown in FIG. 11(b). This gives rise to a phenomenon that are images lie off the surrounding cells of the small lenses 862.

Lying-off parts of light that are not fit within the respective small lenses 862 in the second lens array 860 are not able to illuminate the illuminated region and are wasted, thereby causing loss in quantity of light. Lying-off parts of light referred to herein are equivalent to light that has failed to pass through the small lenses 852 and 862 corresponding to each other in the first lens array 850 and the second lens array 860, respectively.

In the related art lighting device 800, a luminous flux is thought to be able to pass through the small lenses 852 and 862 that correspond to each other in the first lens array 850 and the second lens array 860, respectively, by enhancing the parallelism of an illuminating luminous flux emitted from the collimator lens 840. In practice, however, for part of an illuminating luminous flux at the center in the vicinity of the light-source optical axis 810ax, it remains impossible to pass through the small lenses 852 and 862, and a need for enhancements has been arising.

To this end, the inventor has disclosed a lighting device 900 as another related art lighting device that is capable of separating respective arc images, formed near the light-source optical axis by the small lenses in the first lens array, from each other (for example, see International Publication No. WO 02/088842). FIG. 12 is a schematic to describe another related art lighting device 900. As is shown in FIG. 12, another related art lighting device 900 is configured in such a manner that, of the entire reflection light reflected on a reflection surface 930R of an ellipsoidal reflector 930, at least optical paths $L_1$ heading toward the center about a light-source optical axis 910ax are changed to optical paths $L_3$ heading to a slightly outer side than optical paths $L_2$ parallel to the light-source optical axis 910ax, by increasing a conical constant K of a hyperboloid of revolution 940A of a concave lens 940 used to make an illuminating luminous flux from the light source device 910 almost parallel.

According to another lighting device 900, arc images in the vicinity of the light-source optical axis 910ax are separated more satisfactorily than in the related art lighting device 800. Hence, of the entire reflection light reflected on the reflection surface 930R of the ellipsoidal reflector 930, at least the light paths $L_1$ heading-toward the center about the light-source optical axis 910ax are enabled to pass through small lenses that correspond to each other in the first lens array and the second lens array (neither is shown).

SUMMARY

In another lighting device related art 900, however, it is found that respective arc images formed by the small lenses in the first lens array can be separated from each other in the vicinity of the light-source optical axis 910ax by increasing the conical constant K of the hyperboloid of revolution 940A of the concave lens 940, whereas separation of respective arc images on the edge far from the light-source optical axis 910ax remains unsatisfactory.

The conical constant K of the hyperboloid of revolution 940A may be increased further to separate respective arc images on the edge far from the light-source optical axis 910ax in a satisfactory manner. When the conical constant K of the hyperboloid of revolution 940A is increased further, however, a change rate of the lens power at the center of the hyperboloid of revolution 940A of the concave lens 940 becomes so high that respective arc images in the vicinity of the light-source optical axis 910ax are deformed, and for part of an illuminating luminous flux in the vicinity of the light-source optical axis 910ax, it becomes impossible to pass through the small lenses that correspond to each other in the first lens array and the second lens array. This result in a problem that losses in quantity of light cannot be reduced, and efficiency of utilization of an illuminating luminous flux is thereby lowered.

Exemplary aspects of the invention address and/or solve the foregoing and/or other problems, and provide a lighting device capable of reducing losses in quantity of light and thereby increasing efficiency of utilization of an illuminating luminous flux, and a projector equipped with the same.

In order to achieve the above, by disposing a specific concave surface between the light-incident surface of the concave lens and the first lens array on the surface where plural small lenses are formed to separate respective arc images on the edge far from the light-source optical axis in a satisfactory manner, instead of further increasing the conical constant K of the hyperboloid of revolution, it is possible to effectively suppress deformations of respective arc images in the vicinity of the light-source optical axis that occur when a change rate of the lens power at the center of the hyperboloid of revolution of the concave lens becomes too high.

A lighting device of an exemplary aspect of the invention is a lighting device, including: a light source device having a light-emitting tube and an ellipsoidal reflector to emit an illuminating luminous flux by reflecting light from the light-emitting tube; a concave lens having a light-incident surface formed from a hyperboloid of revolution to make the illuminating luminous flux from the light source device almost parallel; a first lens array having plural small lenses to divide the illuminating luminous flux from the concave lens into plural partial luminous fluxes; and a second lens array having plural small lenses, respectively corresponding to the plural small lenses in the first lens array, to superimpose respective partial luminous fluxes divided by the first lens array on an illuminated region, which is characterized in that a concave surface is present between the light-incident surface of the concave lens and the first lens array on a surface where the plural small lenses are formed. The concave surface is furnished with a function of causing, together with the light-incident surface of the concave lens, an illuminating luminous flux, having passed through the light-incident surface of the concave lens, to travel along an optical path heading to an outer side than an optical path parallel to an optical axis of the light source device, while causing the illuminating luminous flux to pass through the small lenses that correspond to each other in the first lens array and the second lens array.

Hence, according to a lighting device of an exemplary aspect of the invention, to separate respective arc images on the edge far from the light-source optical axis in a satisfactory manner, the specific concave surface is disposed to be present between the light-incident surface of the concave lens and the first lens array on the surface where the plural small lenses are formed, instead of further increasing the conical constant K of the hyperboloid of revolution. It is thus possible to separate respective arc images on the edge far from the light-source optical axis in a satisfactory manner. As a result, because the need to further increase the conical constant K of the hyperboloid of revolution is eliminated, there occurs no event such that a change rate of the lens power at the center of the hyperboloid of revolution becomes so high that respective arc images in the vicinity of the light-source optical axis are deformed. Hence, for an illuminating luminous flux in the vicinity of the light-source optical axis, too, it is possible to form arc images by the small lenses in the first lens array within the corresponding small lenses in the second lens array in a satisfactory manner.

In a lighting device of an exemplary aspect of the invention, the function of separating respective arc images on the edge far from the light-source optical axis in a satisfactory manner is achieved by the hyperboloid of revolution of the concave lens and the specific concave surface disposed between the light-incident surface of the concave lens and the first lens array on the surface where the plural small lenses are formed. This configuration makes it possible to separate respective are images on the edge far from the light-source optical axis in a satisfactory manner without the need to further increase the conical constant K of the hyperboloid of revolution.

A lighting device of an exemplary aspect of the invention thus serves as a lighting device capable of reducing losses in quantity of light and thereby enhancing efficiency of utilization of illuminating luminous fluxes.

In a lighting device of an exemplary aspect of the invention, the concave surface may be formed from a spherical surface.

In a lighting device of an exemplary aspect of the invention, the concave surface may be formed on a light-emission surface of the concave lens. When configured in this manner, there is no need to add any other new optical component.

In a lighting device of an exemplary aspect of the invention, the plural small lenses in the first lens array may be formed on a light-emission surface of the first lens array, and the concave surface is formed on a light-incident surface of the first lens array. When configured in this manner, there is no need to add any other new optical component.

In a lighting device of an exemplary aspect of the invention, a second concave lens may be disposed between the concave lens and the first lens array, and the concave surface may be formed on at least one of a light-incident surface and a light-emission surface of the second concave lens. When configured in this manner, a single second concave lens may merely be added, as described above, to the configuration of the related art lighting device.

A projector of an exemplary aspect of the invention is characterized by including: a lighting device of an exemplary aspect of the invention; an electro-optic modulating device to modulate an illuminating luminous flux from the lighting device according to image information; and a projection optical system to project modulated light from the electro-optic modulating device.

Hence, a projector of an exemplary aspect of the invention, by including an excellent lighting device capable of reducing losses in quantity of light and thereby enhancing efficiency of utilization of illuminating luminous fluxes, serves as a high-intensity projector.

DETAILED DESCRIPTION OF EXEMPLARY EMBODIMENTS

Figure 1:
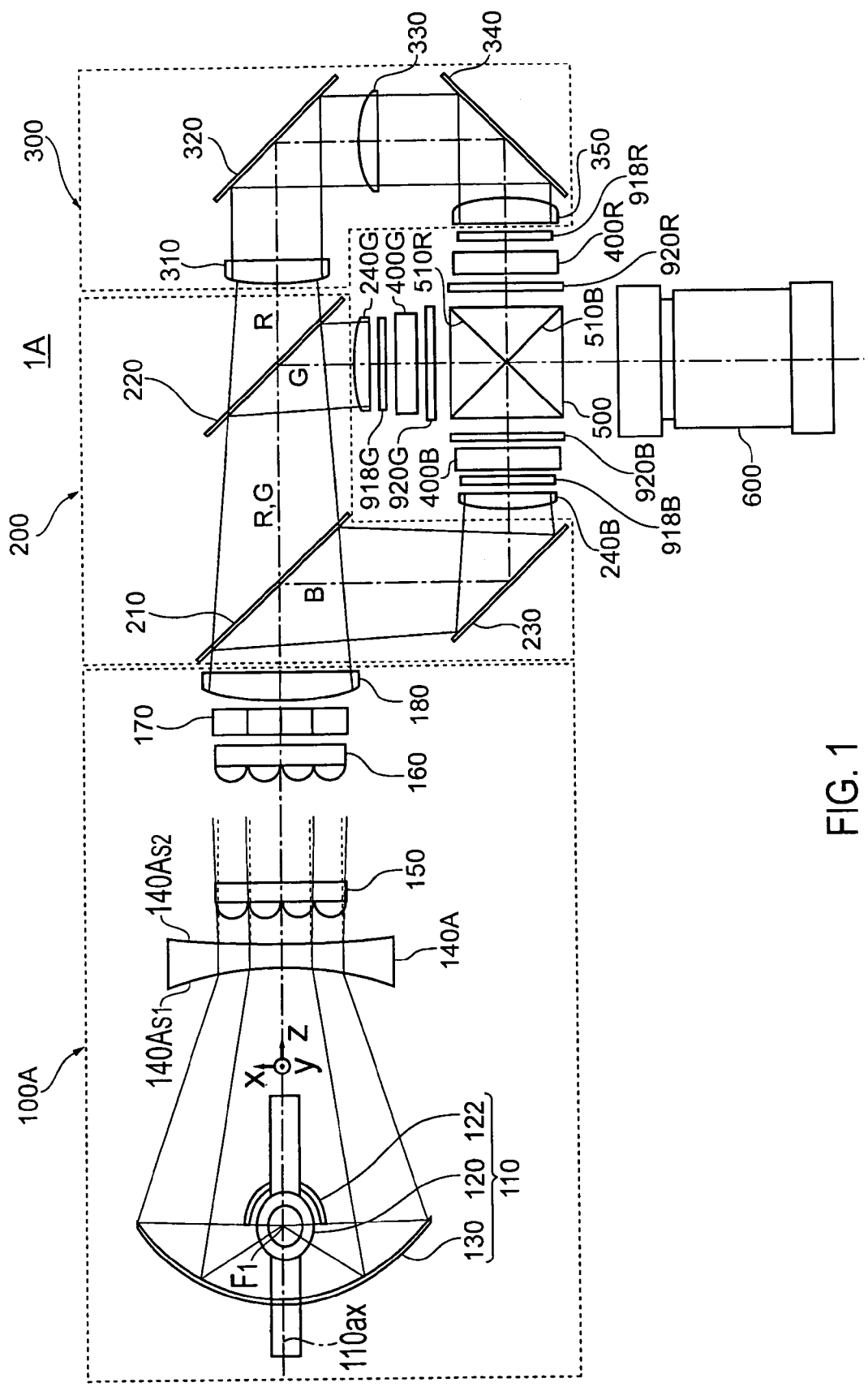
FIG. 1 is a schematic showing an optical system in a projector according to a first exemplary embodiment when viewed from above.

A lighting device of an exemplary aspect of the invention and a projector equipped with the same will now be described by way of exemplary embodiments shown in the drawings.

First Exemplary Embodiment

First, a projector 1A according to a first exemplary embodiment will be described with reference to FIG. 1.

FIG. 1 is a schematic showing an optical system in the projector according to the first exemplary embodiment when viewed from above. Hereinafter, three directions that intersect with each other at right angles are referred to as the z direction (a direction parallel to a light-source optical axis 110ax), the x direction (a direction perpendicular to the z direction and parallel to the sheet surface), and the y direction (a direction perpendicular to the sheet surface).

As is shown in FIG. 1, the projector 1A according to the first exemplary embodiment includes a lighting device 100A, a color-separating optical system 200, a relay optical system 300, three liquid crystal devices 400R, 400G, and 400B used as electro-optic modulating devices, a crossed dichroic prism 500, and a projection optical system 600. Components forming the respective optical systems are disposed in almost a horizontal direction about the crossed dichroic prism 500.

The lighting device 100A includes a light source device 110, a collimator lens 140A, a first lens array 150, a second lens array 160, a polarization conversion element 170, and a superimposing lens 180. An illuminating luminous flux emitted from the light source device 110 is made parallel by the light-incident surface of the concave lens 140A, and divided into plural partial luminous fluxes by the first lens array 150. Respective partial luminous fluxes are then superimposed on the image forming regions in the three liquid crystal devices 400R, 400G, and 400B, which are the subjects to be illuminated, by the second lens array 160 and the superimposing lens 180.

The lighting device 100A will be described in detail below.

The color-separating optical system 200 is furnished with a function of separating an illuminating luminous flux emitted from the lighting device 100A into three colors of illuminating luminous fluxes each having a different wave range. A first dichroic mirror 210 reflects a substantially blue luminous flux (hereinafter, referred to as B light), and transmits a substantially green luminous flux (hereinafter, referred to as G light) and a substantially red luminous flux (hereinafter, referred to as R light). B light reflected on the first dichroic mirror 210 is further reflected on a reflection mirror 230, and passes through a field lens 240B to illuminate the liquid crystal device 400B for B light.

The field lens 240B condenses light for each of plural partial luminous fluxes from the lighting device 100A to illuminate the liquid crystal device 400B for B light. Normally, it is set so that each partial luminous flux becomes almost a parallel luminous flux. Field lenses 240G and 350 respectively disposed in front of the other liquid crystal devices 400G and 400R are configured in the same manner as the field lens 240B.

Of G light and R light having passed through the first dichroic mirror 210, G light is reflected on a second dichroic mirror 220, and passes through the field lens 240G to illuminate the liquid crystal device 400G for G light. Meanwhile, R light passes through the second dichroic mirror 220, and passes through the relay optical system 300 to illuminate the liquid crystal device 400R for R light.

The relay optical system 300 includes a light-incident side lens 310, a light-incident side reflection mirror 320, a relay lens 330, a light-emission side reflection mirror 340, and the field lens 350. R light emitted from the color-separating optical system 200 is converged in the vicinity of the relay lens 330 by the light-incident side lens 310, and scatters toward the light-emission side reflection mirror 340 and the field lens 350. The size of a luminous flux that goes incident on the field lens 350 is set to be almost equal to the size of a luminous flux that goes incident on the light-incident side lens 310.

The liquid crystal devices 400R, 400G, and 400B of respective colors convert lights of corresponding colors that have become incident on their light-incident surfaces into lights according to corresponding image signals, and emit converted lights as transmitting lights. On the light-incident sides of the liquid crystal devices 400R, 400G, and 400B are disposed light-incident side polarization plates 918R, 918G, and 918B, respectively, and on the light-emission sides are disposed light-emission side polarization plates 920R, 920G, and 920B, respectively. Transmission type liquid crystal devices are used as the liquid crystal devices 400R, 400G, and 400B.

The crossed dichroic prism 500 is furnished with a function to serve as a color synthesizing optical system that synthesizes converted lights of respective colors emitted from the liquid crystal devices 400R, 400G, and 400B of respective colors. It includes an R-light reflection dichroic surface 510R on which R light is reflected, and a B-light reflection dichroic surface 510B on which B light is reflected. The R-light reflection dichroic surface 510R and the B-light reflection dichroic surface 510B are provided by forming a dielectric multi-layer film to reflect R light and a dielectric multi-layer film to reflect B light almost in the shape of a capital X on the interfaces of four rectangular prisms. With the use of these two reflection dichroic surfaces 510R and 510B, converted lights of three colors are synthesized into light to display a color image. The synthesized light generated in the crossed dichroic prism 500 is emitted toward the projection optical system 600.

The projection optical system 600 is configured to project synthesized light from the crossed dichroic prism 500 onto a projection surface, such as a screen, in the form of a display image.

Figure 2A:
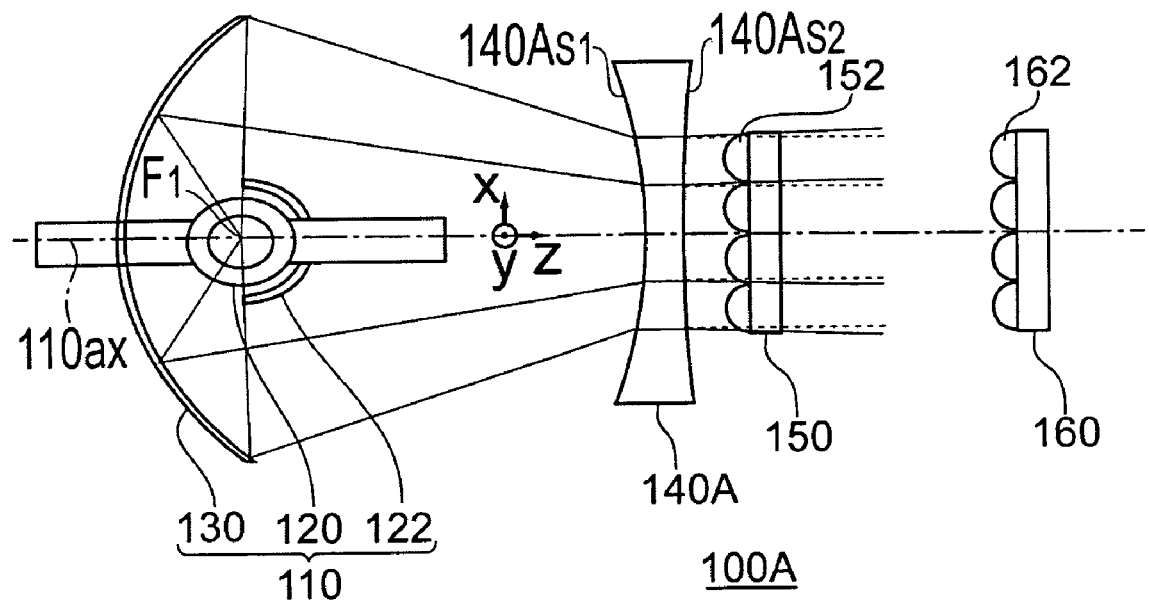
FIGS. 2(a) and 2(b) are schematics used to describe a lighting device according to the first exemplary embodiment.
Figure 2B:
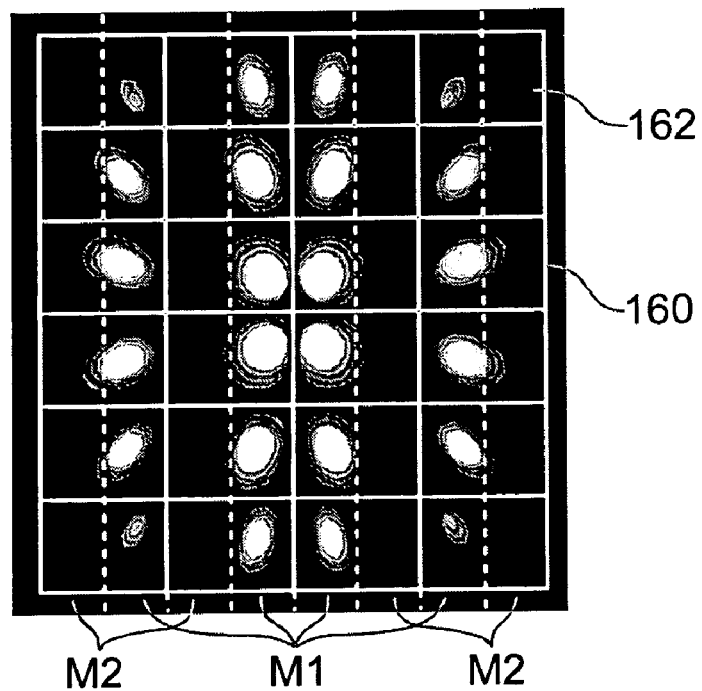

The lighting device 100A according to the first exemplary embodiment will now be described in detail with reference to FIG. 2. FIGS. 2(a) and 2(b) are schematics used to describe the lighting device according to the first exemplary embodiment. FIG. 2(a) is a schematic showing a part of the lighting device when viewed from above, and FIG. 2(b) is a schematic showing as images on the second lens array.

As is shown in FIG. 1 and FIG. 2(a), the lighting device 100A according to the first exemplary embodiment includes the light source device 110, the concave lens 140A, the first lens array 150, the second lens array 160, the polarization converting element 170, and the superimposing lens 180.

The light source device 110 includes a light-emitting tube 120, an auxiliary mirror 122, and an ellipsoidal reflector 130. The light-emitting tube 120 is disposed in such a manner that its center of light emission is in close proximity to the position of a first focal point $F_1$ of the ellipsoidal reflector 130. The ellipsoidal reflector 130 is open toward the illuminated region, and is disposed behind the light-emitting portion of the light-emitting tube 120. It is configured to emit light toward the illuminated region by reflecting light from the light-emitting tube 120. The auxiliary mirror 122 includes a reflection concave surface body disposed at a location closer to the illuminated region than the light-emitting portion of the light-emitting tube 120, and is configured to enhance efficiency of light utilization by reflecting light, emitted toward the illuminated region from the light-emitting portion, on the ellipsoidal reflector 130.

The concave lens 140A includes a lens optical axis parallel to the light-source optical axis 110ax, and is disposed on the side of the illuminated region of the light source device 110. On the light-incident surface of the concave lens 140A is formed a hyperboloid of revolution $140A_{S1}$ to make an illuminating luminous flux from the light source device 110 almost parallel, and a concave surface $140A_{S2}$ including a spherical surface formed on the light-emission surface. The concave surface $140A_{S2}$ is furnished with a function of causing, together with the hyperboloid of revolution $140A_{S1}$, an illuminating luminous flux having passed through the hyperboloid of revolution $140A_{S1}$ to travel along light paths heading to an outer side than light paths parallel to the light-source optical axis 110ax (the optical axis of the light source device 110), while causing the illuminating luminous flux to pass through the small lenses 152 and 162 that correspond to each other in the first lens array 150 and the second lens array 160, respectively.

The first lens array 150 includes plural small lenses 152 aligned in a matrix fashion, and is configured to divide an illuminating luminous flux from the light source device 110 into plural partial luminous fluxes. Each small lens 152 is formed to have an outside shape almost analogous to the shape of the illuminated region when viewed along the z direction.

The second lens array 160 includes plural small lenses 162 respectively corresponding to the plural small lenses 152 in the first lens array 150. As with the small lenses 152 in the first lens array 150, the small lenses 162 are aligned in a matrix fashion, and are configured to superimpose, together with the superimposing lens 180, are images formed by the plural small lenses 152 in the first lens array 150 to be illuminated on the illuminated region.

The polarization converting element 170 is furnished with a function of changing unpolarized light to polarized light having polarization directions usable in the three liquid crystal devices 400R, 400G, and 400B. On the light-incident surface of the polarization converting element 170 is disposed a light-blocking plate (not shown) to block unwanted light from the second lens array 160 or the like.

The superimposing lens 180 includes a condensing lens, and is disposed on the side of the illuminated region of the polarization converting element 140. It is configured to condense illuminating luminous fluxes emitted from the polarization converting element 140 in superimposing, together with the second lens array 160, the illuminating luminous fluxes on image forming regions in the liquid crystal devices 400R, 400G, and 400B.

In the lighting device 100A according to the first exemplary embodiment, as described above, the concave surface $140A_{S2}$, serving as the light-emission surface of the concave lens 140A, is formed between the light-incident surface of the concave lens 140A and the first lens array 150 on the surface where the plural small lenses 152 are formed.

Hence, with the lighting device 100A according to the first exemplary embodiment, to separate respective arc images on the edge far from the light-source optical axis 110ax in a satisfactory manner, the specific concave surface $140A_{S2}$ is disposed to be present between the light-incident surface of the concave lens 140A and the first lens array 150 on the surface where the plural small lenses 152 are formed, instead of further increasing the conical constant K of the hyperboloid of revolution $140A_{S1}$. It is thus possible to separate respective arc images on the edge far from the light-source optical axis 110ax in a satisfactory manner. As a result, because the need to further increase the conical constant K of the hyperboloid of revolution $140A_{S1}$ is eliminated, there occurs no event such that a change rate of the lens power at the center of the hyperboloid of revolution $140A_{S1}$ becomes so high that respective arc images in the vicinity of the light-source optical axis 110ax are deformed. Hence, for an illuminating luminous flux in the vicinity of the light-source optical axis 110ax, too, it is possible to form arc images by the small lenses 152 in the first lens array 150 within the corresponding small lenses 162 in the second lens array 160 in a satisfactory manner.

In the lighting device 100A according to the first exemplary embodiment, the function of separating respective arc images on the edge far from the light-source optical axis 110ax in a satisfactory manner is achieved by the hyperboloid of revolution $140A_{S1}$ of the concave lens 140A and the specific concave surface $140A_{S2}$ disposed between the light-incident surface of the concave lens 140A and the first lens array 150 on the surface where the plural small lenses 152 are formed. This configuration makes it possible to separate respective arc images on the edge far from the light-source optical axis 110ax in a satisfactory manner without the need to further increase the conical constant K of the hyperboloid of revolution $140A_{S1}$.

The lighting device 100A according to the first exemplary embodiment thus serves as a lighting device capable of reducing losses in quantity of light and thereby enhancing efficiency of utilization of illuminating luminous fluxes.

In the lighting device 100A according to the first exemplary embodiment, the concave surface $140A_{S2}$ is a spherical surface.

In the lighting device 100A according to the first exemplary embodiment, the concave surface $140A_{S2}$ is formed on the light-emission side of the concave lens 140A. Therefore, there is no need to add any other new optical component.

Figure 3A:
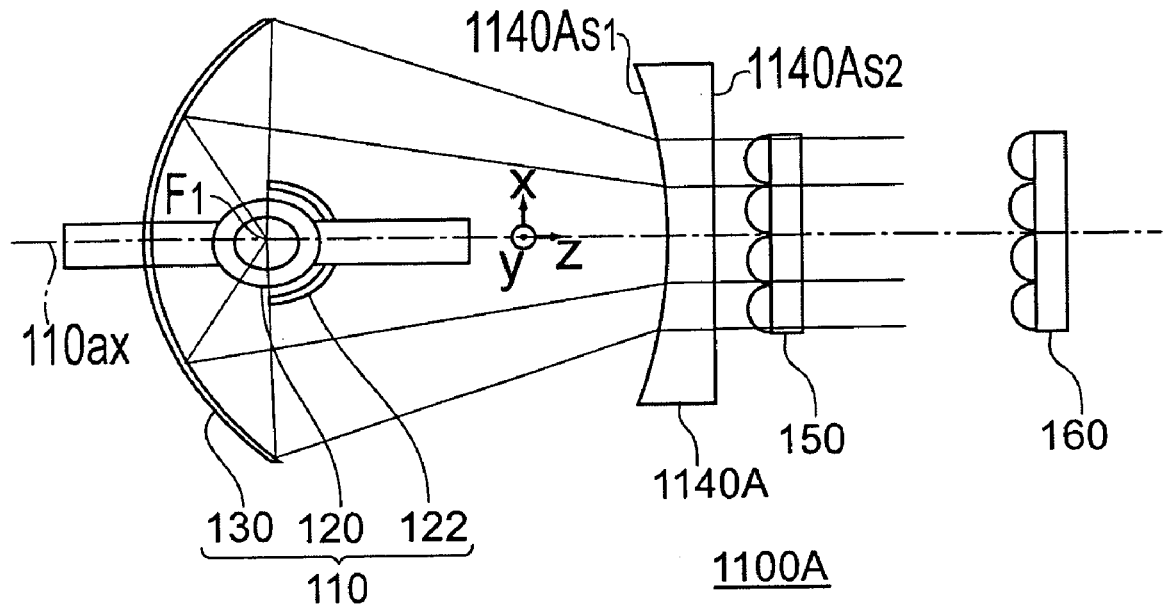
FIGS. 3(a) and 3(b) are schematics used to describe a lighting device according to a first comparative example.
Figure 3B:
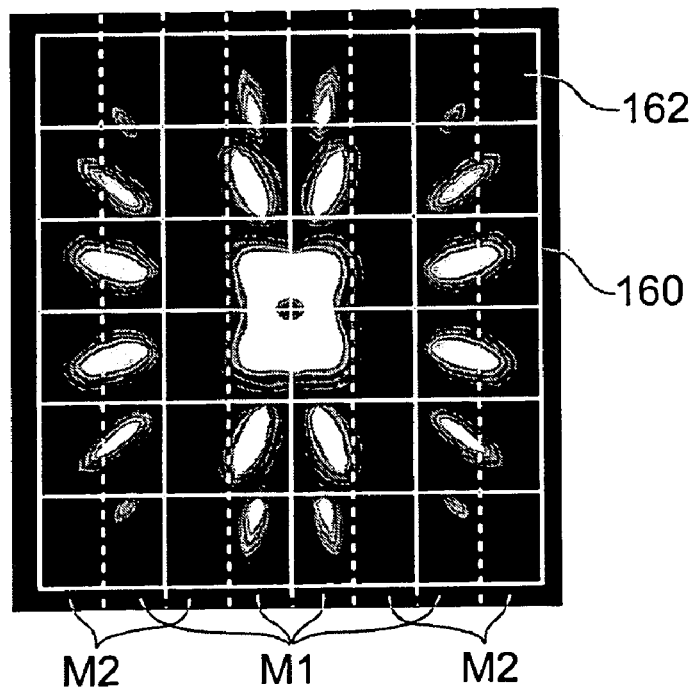
Figure 4A:
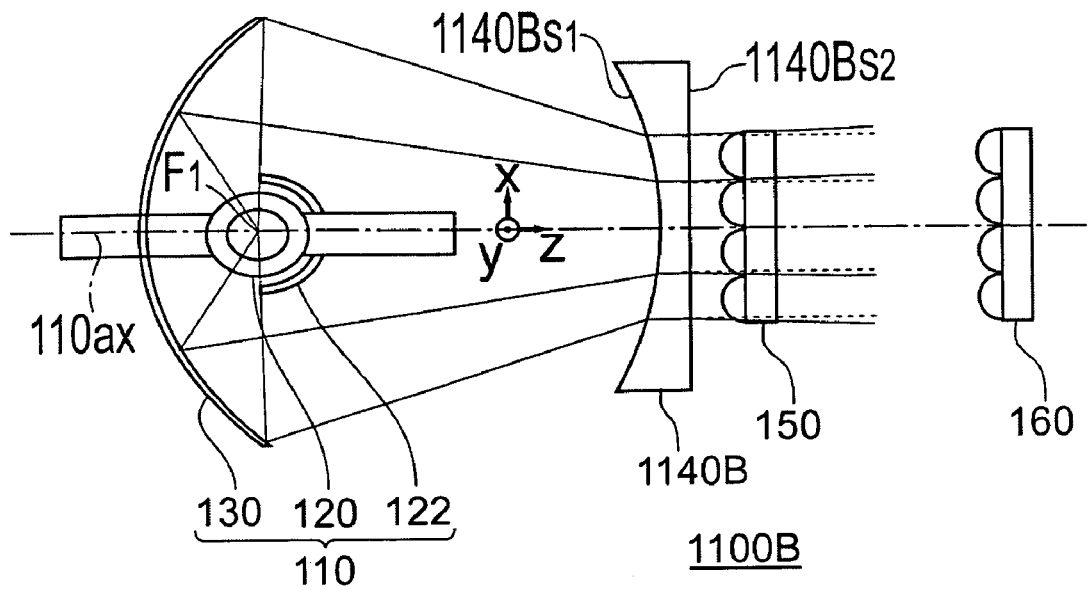
FIGS. 4(a) and 4(b) are schematics used to describe a lighting device according to a second comparative example.
Figure 4B:
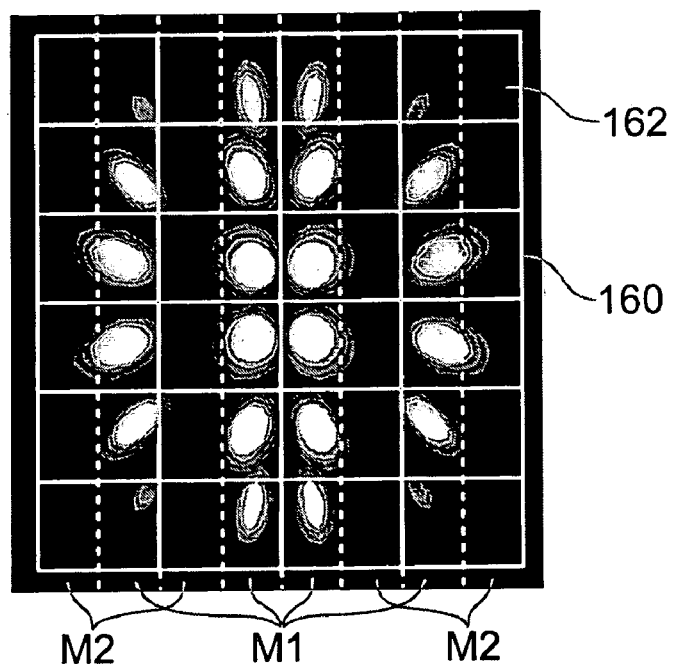

Some of the advantages of the lighting device 100A according to the first exemplary embodiment will now be described more in detail by describing lighting devices according to comparative examples of the first exemplary embodiment. FIGS. 3(a) and 3(b) are schematics used to describe the lighting device according to a first comparative example. FIG. 3(a) is a schematic showing a part of the lighting device when viewed from above, and FIG. 3(b) is a schematic showing arc images on the second lens array. FIGS. 4(a) and 4(b) are schematics used to describe a lighting device according to a second comparative example. FIG. 4(a) is a schematic showing a part of the lighting device when viewed from above, and FIG. 4(b) is a schematic showing arc images on the second lens array.

Figure 7:
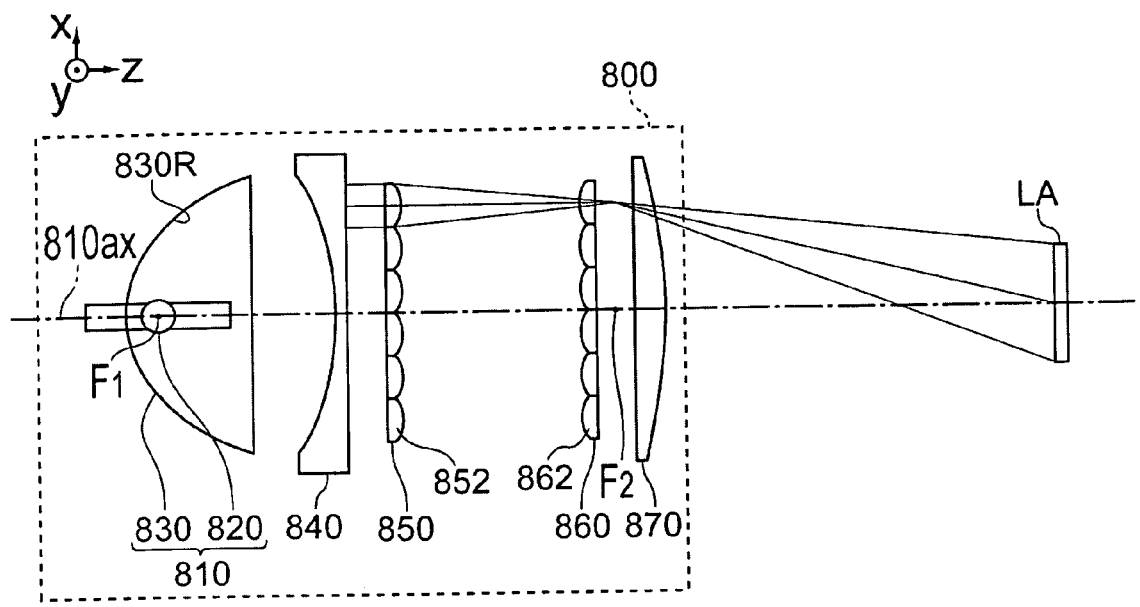
FIG. 7 is a schematic showing a related art lighting device when viewed from above.
Figure 8:
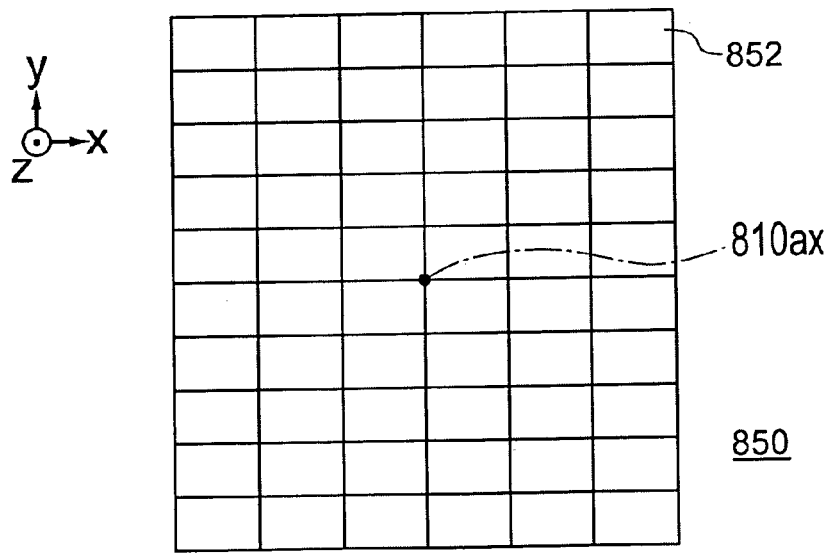
FIG. 8 is a schematic of a first lens array when viewed along a light-source optical axis.
Figure 9:
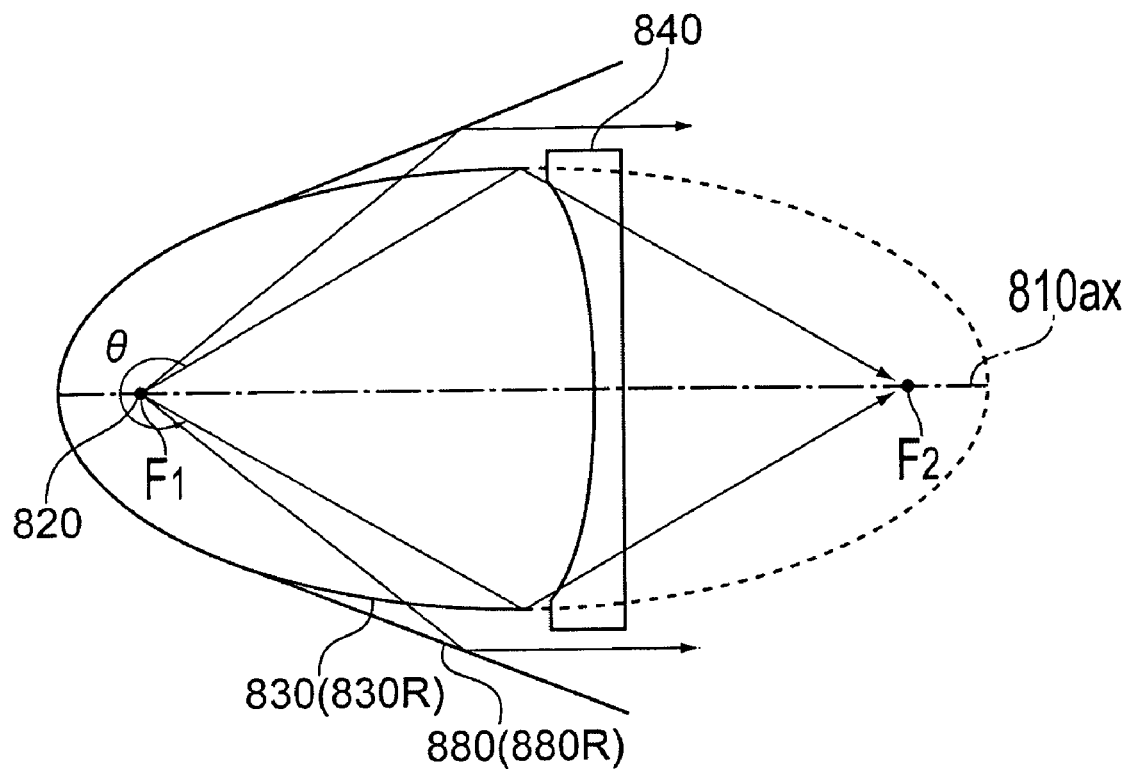
FIG. 9 is a schematic used to explain a problem in a lighting device using a parabolic reflector.
Figure 10:
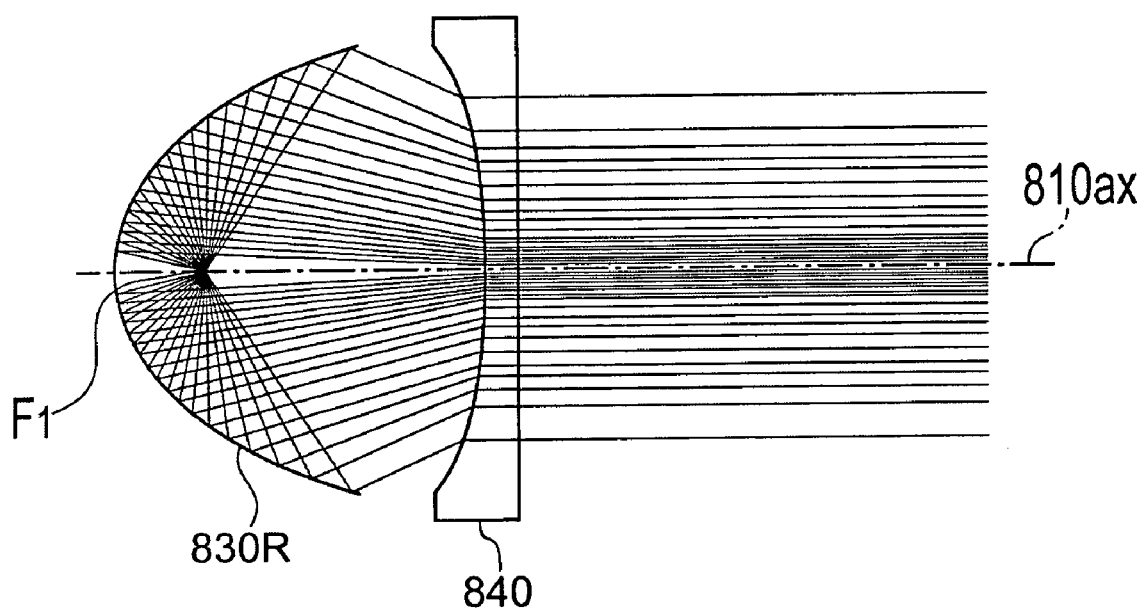
FIG. 10 is a schematic showing loci of light in a related art lighting device using an ellipsoidal reflector.
Figure 11A:
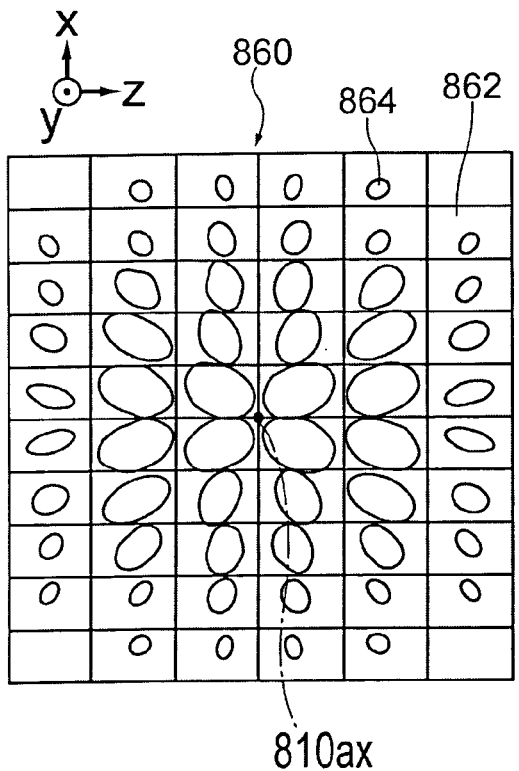
FIGS. 11(a) and 11(b) are schematics used to explain are images on a second lens array.
Figure 11B:
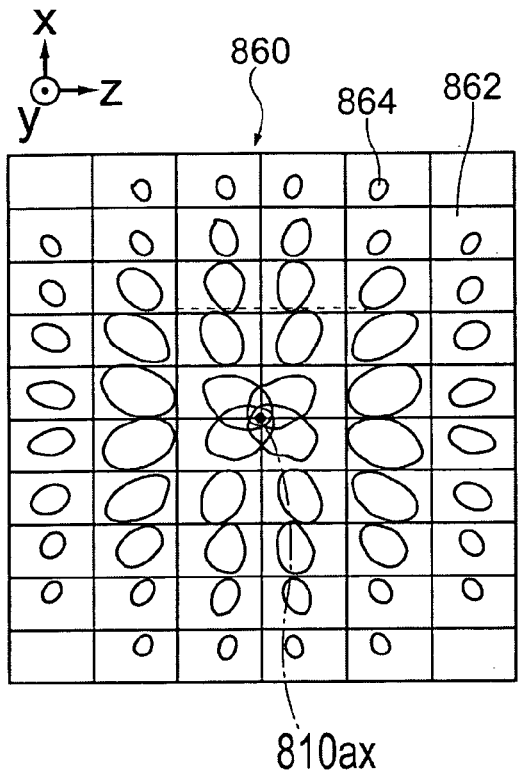

As is shown in FIG. 3(a), a lighting device 1100A according to the first comparative example includes a concave lens 1140A whose light-incident surface includes a hyperboloid of revolution $1140A_{S1}$ and whose light-emission surface includes a flat surface $1140A_{S2}$, as with the related art lighting device 800 (see FIG. 7). With the lighting device 1100A according to the first comparative example, as is shown in FIG. 3(b), are images formed on the second lens array 160, which are supposed to be fit within the respective small lenses 162, are biased toward the proximity to the light-source optical axis 110ax and lie off the surrounding cells of the small lenses 162.

Figure 12:
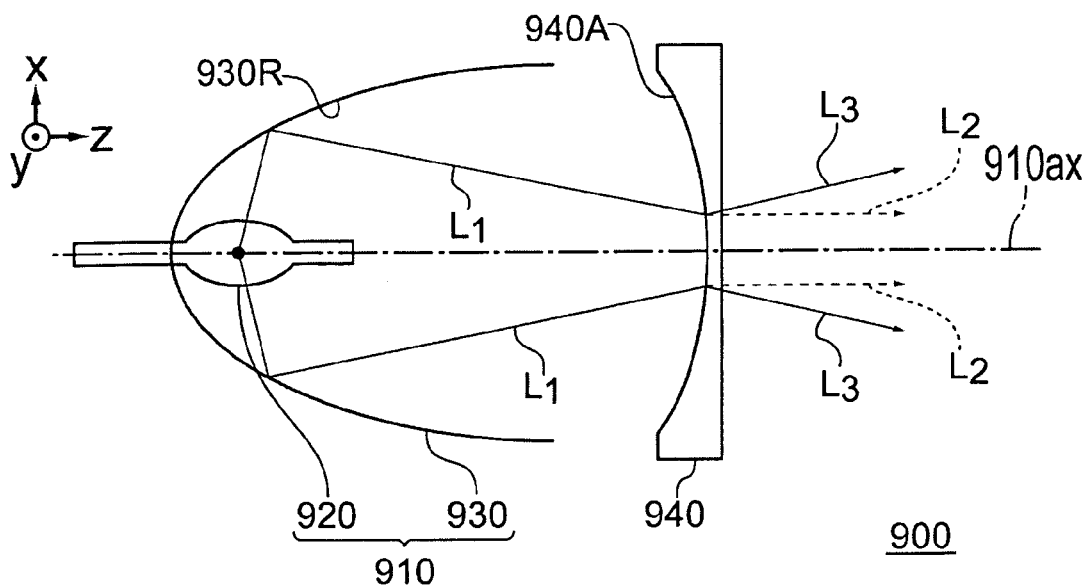
FIG. 12 is a schematic used to describe another related art lighting device.

As is shown in FIG. 4(a), a lighting device 1100B according to the second comparative example includes a concave lens 1140B whose light-incident surface includes a hyperboloid of revolution $1140B_{S1}$ having a greater conical constant K and whose light-emission surface includes a flat surface $1140B_{S2}$, as with the related art lighting device 900 (see FIG. 12). With the lighting device 1100B according to the second comparative example, as is shown in FIG. 4(b), are images in the vicinity of the light-source optical axis 110ax are indeed separated from each other. However, it is understood that separation of respective arc images on the edge far from the light-source optical axis 110ax remains unsatisfactory.

In this case, the conical constant K of the hyperboloid of revolution $1140B_{S1}$ may be increased further to separate respective arc images on the edge far from the light-source optical axis 110ax in a satisfactory manner. However, when the conical constant K of the hyperboloid of revolution $1140B_{S1}$ is increased further, a change range of the lens power at the center of the hyperboloid of revolution $1140B_{S1}$ becomes so high that respective arc images in the vicinity of the light-source optical axis 110ax are deformed. This makes it impossible for part of illuminating luminous fluxes in the vicinity of the light-source optical axis 110ax to pass through the small lenses 152 and 162 that correspond to each other in the first lens array 150 and the second lens array 160, respectively. Hence, losses in quantity of light cannot be reduced, and efficiency of utilization of illuminating luminous fluxes is thus lowered.

A ratio of light irradiated to a region M2 corresponding to the light-blocking plate of the polarization converting element 170 (not shown) becomes larger, and, in turn, a ratio of light irradiated to a region M1 corresponding to the light-incident surface of the polarization converting element 170 becomes smaller, which lowers efficiency of light utilization.

In contrast, it is understood that, in the lighting device 100A according to the first exemplary embodiment, as is shown in FIG. 2(b), are images in the vicinity of the light-source optical axis 110ax as well as are images on the edge far from the light-source optical axis 110ax are separated in a satisfactory manner. In addition, a ratio of light irradiated to the region M2 corresponding to the light-blocking plate of the polarization converting element 170 (see FIG. 1) becomes smaller. This eliminates a case where efficiency of light utilization is lowered as a ratio of light irradiated to the region M1 corresponding to the light-incident surface of the polarization converting element 170 is reduced.

As is obvious from comparison with the lighting devices 1100A and 1100B according to the first and second examples, respectively, the lighting device 100A according to the first exemplary embodiment thus serves as a lighting device capable of reducing losses in quantity of light and thereby enhancing efficiency of utilization of illuminating luminous fluxes.

As is shown in FIG. 1, the projector 1A according to the first exemplary embodiment includes the lighting device 100A, the liquid crystal devices 400R, 400G, and 400B to modulate illuminating luminous fluxes from the lighting device 100A according to image information, and the projection optical system 600 to project modulated lights from the liquid crystal devices 400R, 400G, and 400B.

Hence, the projector 1A according to the first exemplary embodiment serves as a high-intensity projector, because it includes the excellent lighting device 100A capable of reducing losses in quantity of light and thereby enhancing efficiency of utilization of illuminating luminous fluxes.

A designing method for respective optical components in the lighting device 100A according to the first exemplary embodiment will now be described.

There is an optimum combination (it varies widely depending on the shape of the ellipsoidal reflector 130, a refractive index of the concave lens 140A, the location of the concave lens 140A, etc.) of the ellipsoidal reflector 130 and the concave lens 140A for an illuminating luminous flux having passed through the light-incident surface of the concave lens 140A to be changed to ideal parallel lights. In this specification, various modifications will be added, which will be described with the lighting device 100A according to the first exemplary embodiment and lighting devices 100B and 100C, respectively, according to second and third exemplary embodiments described below.

As to a designing method of respective optical components to achieve an optimum combination capable of obtaining ideal parallel lights, the inventor has disclosed in JP-A-2000-347293 that ideal parallel lights can be obtained when the shape of the light-incident surface of the concave lens satisfies Equation (1):

$$Z - \frac{c \cdot r^2}{1 + \sqrt{1 - (1+K) \cdot c^2 \cdot r^2}} = 0 \quad (1)$$

In Equation (1) above, r and Z are coordinate values in the r$\theta$Z cylindrical coordinate system that is axial symmetric to the light-source optical axis 110$ax$, given the intersection of the light-incident surface of the concave lens 140A and the light-source optical axis 110$ax$ as an origin. Herein, r is a distance from the origin in a direction that intersects with the optical axis at right angles, and Z is a distance from the origin in the optical axis direction. Also, c is a paraxial radius of curvature.

K is a value referred to as a conical constant. In the lighting device 100A according to the first exemplary embodiment, the light-incident surface of the concave lens 140A includes a hyperboloid of revolution, which gives K<−1 as the value of the conical constant K.

The paraxial radius of curvature, c, is found by taking into account the shape of the reflection surface of the ellipsoidal reflector 130, the refractive index of the concave lens 140A, the thickness at the center of the concave lens 140A, and the location of the concave lens 140A. Specifically, the shape of the reflection surface of the ellipsoidal reflector 130, the refractive index of the concave lens 140A, the thickness at the center of the concave lens 140A, and the location of the concave lens 140A have been determined previously. In a case where a concave lens having the same refractive index and the thickness at the center as the concave lens 140A is used at the predetermined position for an ellipsoidal reflector having the same shape as the previously determined shape of the reflection surface of the ellipsoidal reflector 130, a radius of curvature with which a luminous flux is converted to parallel lights in the paraxial region is found, which is defined as the paraxial radius of curvature, c. When the shape of the hyperboloid of revolution of the concave lens capable of obtaining ideal parallel lights is determined, a combination of the ellipsoidal reflector 130 and the concave lens 140A, specifically, the shape of the reflection surface of the ellipsoidal reflector 130, the location of the concave lens 140A, and the paraxial radius of curvature, c, have been determined.

In a case where the light-incident surface of the concave lens 140A includes a hyperboloid of revolution as in the lighting device 100A according to the first exemplary embodiment, let n be a refractive index of the concave lens 140A, and the conical constant K be defined as K=−n$^2$, then by using a hyperboloid of revolution that satisfies Equation (1) above with the conical constant K defined as above, it is possible to obtain parallel lights.

Optical power at the center of the hyperboloid of revolution can be raised by increasing the value of the conical constant K of the hyperboloid of revolution. By increasing the value of the conical constant K little by little, it is possible to gradually change an optical path of an illuminating luminous flux that has been made parallel to the light-source optical axis 110$ax$ to an optical path heading outward. Hence, by increasing the value of the conical constant K little by little, it is possible to gradually separate arc images biased toward the light-source optical axis on the second lens array to radial directions.

In this case, however, when the value of the conical constant K is increased further in separating respective arc images on the edge far from the light-source optical axis in a satisfactory manner, a change rate of the lens power at the center of the hyperboloid of revolution becomes so high that respective arc images in the vicinity of the light-source optical axis are deformed. Hence, not only is it necessary to adjust the value of the conical constant K of the hyperboloid of revolution, but it is also necessary to adjust the value of a radius of curvature, R, of the concave surface.

To this end, the lighting device 100A according to the first exemplary embodiment performs simulations, in which the value of the conical constant K of the hyperboloid of revolution 140A$_{S1}$ of the concave lens 140A is given as the initial value and the conical constant K is increased little by little, whereas the initial value of the radius of curvature, R, of the concave surface 140A$_{S2}$ is given as R=∞ and the radius of curvature, R, is decreased little by little. Then, the conical constant K and the radius of curvature, R, when arc images biased toward the light-source optical axis 110$ax$ are fit within the small lenses 162 where they are supposed to be fit within, are determined as optimum conical constant K$_P$ and radius of curvature, R$_P$, used to determine the hyperboloid of revolution 140A$_{S1}$ and the concave surface 140A$_{S2}$ of the concave lens 140A.

The shape of the concave lens 140A in the lighting device 100A according to the first exemplary embodiment is determined to have the hyperboloid of revolution 140A$_{S1}$ satisfying Equation (1) above with the conical constant K$_P$ thus determined as the light-incident surface, and the concave surface 140A$_{S2}$ including a spherical surface having the radius of curvature, R, being defined as R=R$_P$ as the light-emission surface. Other configurations (the shape of the reflection surface of the ellipsoidal reflector 130, the location of the concave lens 140A, etc.) are the same as the configurations that enable an illuminating luminous flux having passed through the light-incident surface of the concave lens 140A to be changed to ideal parallel lights. It is thus possible to allow an illuminating luminous flux having passed through the light-incident surface of the concave lens 140A to travel along optical paths on the outer side than optical paths parallel to the light-source optical axis 110ax while inhibiting the illuminating luminous flux from traveling the paths parallel to the light-source optical axis 110ax. Hence, as is shown in FIG. 2(b), respective are images formed by the small lenses 152 in the first lens array 150 can be fit within the corresponding small lenses 162 in the second lens array 160. Losses in quantity of light can be thereby reduced, which can in turn enhance efficiency of utilization of illuminating luminous fluxes.

Second Exemplary Embodiments

Figure 5:
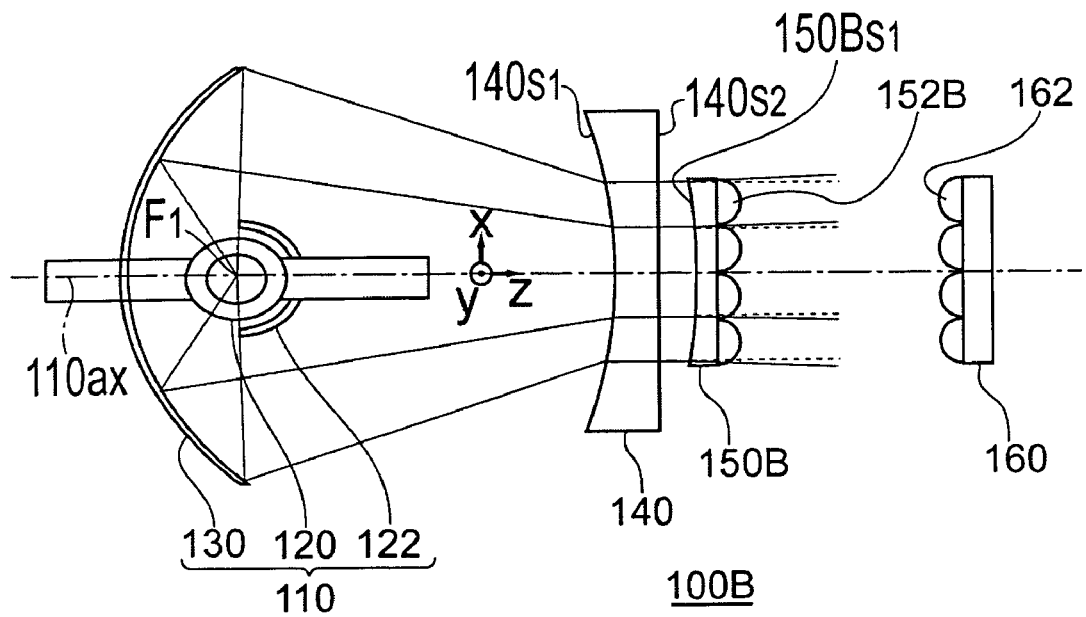
FIG. 5 is a schematic used to describe a lighting device according to a second exemplary embodiment.

A lighting device 100B according to a second exemplary embodiment will now be described with reference to FIG. 5. FIG. 5 is a schematic used to describe the lighting device according to the second exemplary embodiment. In FIG. 5, like members are labeled with like reference numerals with respect to FIG. 2(a) and a detailed description thereof is omitted.

As is shown in FIG. 5, the lighting device 100B according to the second exemplary embodiment is characterized in that a concave surface $150B_{S1}$ including a spherical surface is formed on the light-incident surface of the first lens array 150B (the surface opposite to the surface where the plural small lenses 152B are formed), and the concave surface $150B_{S1}$ is furnished with a function of causing, together with the hyperboloid of revolution $140_{S1}$ formed on the light-incident surface of the concave lens 140, an illuminating luminous flux having passed through the light-incident surface of the concave lens 140 to travel along optical paths heading to an outer side than optical paths parallel to the light-source optical axis 110ax, while causing the illuminating luminous flux to pass through the small lenses 152B and 162 that correspond to each other in the first lens array 150B and the second lens array 160, respectively.

With the lighting device 100A according to the second exemplary embodiment, separating respective are images on the edge far from the light-source optical axis 110ax in a satisfactory manner, the concave surface $150B_{S1}$ as described above is disposed to be present between the light-incident surface of the concave lens 140 and the first lens array 150B on the surface where the plural small lenses 152B are formed, instead of further increasing the conical constant K of the hyperboloid of revolution $140_{S1}$. As with the first exemplary embodiment, it is thus possible to separate respective are images on the edge far from the light-source optical axis 110ax in a satisfactory manner. As a result, because the need to further increase the conical constant K of the hyperboloid of revolution $140_{S1}$ is eliminated, there occurs no event such that a change rate of the lens power at the center of the hyperboloid of revolution $140_{S1}$ becomes so high that respective are images in the vicinity of the light-source optical axis 110ax are deformed. Hence, for a lighting flux in the vicinity of the light-source optical axis 110ax, too, it is possible to form are images by the small lenses 152B in the first lens array 150B within the corresponding small lenses 162 of the second lens array 160 in a satisfactory manner.

The lighting device 100B according to the second exemplary embodiment thus serves as a lighting device capable of reducing losses in quantity of light and thereby enhancing efficiency of utilization of illuminating luminous fluxes.

As has been described, in the lighting device 100B according to the second exemplary embodiment, the plural small lenses 150B in the first lens array 150B are formed on the light-emission surface of the first lens array 150B, and the concave surface $150B_{S1}$ is formed on the light-incident surface of the first lens array 150B. The invention, therefore, can be achieved without the need to add any other new optical component.

When the shapes of the optical components, such as the concave lens 140 and the first lens array 150B, in the lighting device 100B according to the second exemplary embodiment are determined, the conical constant K of the hyperboloid of revolution $140_{S1}$ of the concave lens 140 and the radius of curvature, R, of the concave surface $150B_{S1}$, including a spherical surface, of the first lens array 150B are determined by the same designing method described above that is used for the respective optical components in the lighting device 100A according to the first exemplary embodiment.

Third Exemplary Embodiment

Figure 6:
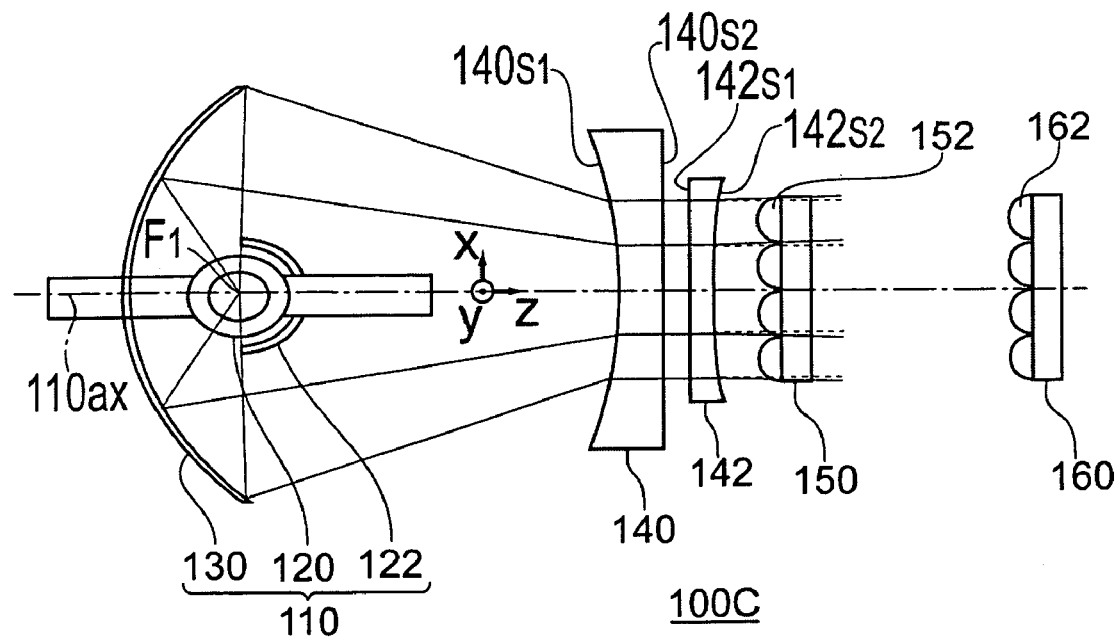
FIG. 6 is a schematic used to describe a lighting device according to a third exemplary embodiment.

A lighting device 100C according to a third exemplary embodiment will now be described with reference to FIG. 6. FIG. 6 is a schematic used to describe the lighting device according to the third exemplary embodiment. In FIG. 6, like members are labeled with like reference numerals with respect to FIG. 2(a) and a detailed description thereof is omitted.

As is shown in FIG. 6, the lighting device 100C according to the third exemplary embodiment is characterized in that a second concave lens 142 having a concave surface $142_{S2}$ is disposed between the concave lens 140 and the first lens array 150, and the concave surface $142_{S2}$ is furnished with a function of causing, together with the hyperboloid of revolution $140_{S1}$ formed on the light-incident surface of the concave lens 140, an illuminating luminous flux having passed through the light-incident surface of the concave lens 140 to travel along optical paths heading to an outer side than optical paths parallel to the light-source optical axis 110ax, while causing the illuminating luminous flux to pass through the small lenses 152 and 162 that correspond to each other in the first lens array 150 and the second lens array 160, respectively.

With the lighting device 100C according to the third exemplary embodiment, to separate respective are images on the edge far from the light-source optical axis 110ax in a satisfactory manner, the concave surface $142_{S2}$ as described above is disposed to be present between the light-incident surface of the concave lens 140 and the first lens array 150 on the surface where the plural small lenses 152 are formed, instead of further increasing the conical constant K of the hyperboloid of revolution $140_{S1}$. It is thus possible to separate respective are images on the edge far from the light-source optical axis 110ax in a satisfactory manner. As a result, because the need to further increase the conical constant K of the hyperboloid of revolution $140_{S1}$ is eliminated, there occurs no event such that a change rate of the lens power at the center of the hyperboloid of revolution $140_{S1}$ becomes so high that respective are images in the vicinity of the light-source optical axis 110ax are deformed. Hence, for an illuminating luminous flux in the vicinity of the light-source optical axis 110ax, too, it is possible to form are images by the small lenses 152 in the first lens array 150 within the corresponding small lenses 162 in the second lens array 160 in a satisfactory manner.

The lighting device 100C according to the third exemplary embodiment thus serves as a lighting device capable of reducing losses in quantity of light and thereby enhancing efficiency of utilization of illuminating luminous fluxes.

As has been described, in the lighting device 100C according to the third exemplary embodiment, the second concave lens 142 is disposed between the concave lens 140 and the first lens array 150, and the concave surface 142$_{S2}$ is formed on the light-emission surface of the second concave lens 142. Exemplary aspects of the invention, therefore, can be achieved by merely adding a single second concave lens 142 as described above to the configuration of the lighting device in the related art.

While the lighting device 100C according to the third exemplary embodiment has been described in a case where the concave surface 142$_{S2}$ is formed on the light-emission surface of the second concave lens 142, the exemplary aspect of the invention is not limited to this configuration. The concave surface may be formed on the light-incident surface of the second concave lens, or the concave surface may be formed on both the light-incident surface and the light-emission surface of the second concave lens.

When the shapes of the optical components, such as the concave lens 140 and the second concave lens 142, in the lighting device 100C according to the third exemplary embodiment are determined, the conical constant K of the hyperboloid of revolution 140$_{S1}$ of the concave lens 140 and the radius of curvature, R, of the concave surface 142$_{S2}$, including a spherical surface, of the concave lens 142 are determined by the same designing method described above that is used for the respective optical components in the lighting device 100A according to the first exemplary embodiment.

While the lighting devices of exemplary aspects of the invention and the projector equipped with the same have been described by way of exemplary embodiments, the exemplary aspects of the invention are not limited to the exemplary embodiments described above and can be implemented otherwise in various manners without deviating from the scope of the invention. For instance, modifications as follows are possible.

In each exemplary embodiment above, a spherical surface is used as the specific concave surface. However, the exemplary embodiments of the invention are not limited to this configuration, and various aspherical surfaces can be used as the specific concave surface as well.

The projector 1A according to the first exemplary embodiment has been described in a case where the lighting device of an exemplary aspect of the invention is applied to a transmission type projector by way of example. However, exemplary aspects of the invention are also applicable to a reflection type projector. The transmission type referred to herein means a type in which electro-optic modulating devices serving as a light modulating device transmits light like a transmission type liquid crystal device or the like. The reflection type referred to herein means a type in which electro-optic modulating devices serving as a light modulating device reflect light like a reflection type liquid crystal device or the like. When the lighting device of an exemplary aspect of the invention is applied to a reflection type projector, substantially the same advantages as those attained by the transmission type projector can be achieved.

The projector 1A according to the first exemplary embodiment has been described as a projector that displays a color image by way of example. However, the exemplary aspects of the invention are not limited to this configuration, and may also be applicable to a projector that displays a monochrome image.

The projector 1A according to the first exemplary embodiment has been described as a projector using three liquid crystal devices 400R, 400G, and 400B by way of example. However, the exemplary aspects of the invention are not limited to this configuration, and may also be applicable to a projector using two or four or more liquid crystal devices.

The projector 1A according to the first exemplary embodiment uses liquid crystal devices 400R, 400G, and 400B as electro-optic modulating devices. However, the invention is not limited to this configuration. Any electro-optic modulating device that modulates incident light according to image information is generally available, and a micro-mirror type light modulating device may be used. A DMD (DIGITAL Micro-mirror Device: a trademark of Texas Instruments) can be used as the micro-mirror type light modulating device.

Exemplary aspects of the invention are applicable to both a front projector that projects an image from the side where one views a projection image and a rear projector that projects an image from opposite to the side where one views a projection image.

The invention claimed is:

1. A lighting device, comprising:
   a light source device including a light-emitting tube and an ellipsoidal reflector to emit an illuminating luminous flux by reflecting light from the light-emitting tube;
   a concave lens having a light-incident surface including a hyperboloid of revolution to make the illuminating luminous flux from the light source device almost parallel;
   a first lens array having plural small lenses to divide the illuminating luminous flux from the concave lens into plural partial luminous fluxes; and
   a second lens array having plural small lenses, respectively corresponding to the plural small lenses in the first lens array, to superimpose respective partial luminous fluxes divided by the first lens array on an illuminated region,
   a concave surface being present between the light-incident surface of the concave lens and the first lens array on a surface where the plural small lenses are formed, and the concave surface having a shape that causes, together with the light-incident surface of the concave lens, an illuminating luminous flux passing through the light-incident surface of the concave lens to travel along an optical path heading to an outer side rather than an optical path parallel to an optical axis of the light source device, while causing the illuminating luminous flux to pass through the small lenses that correspond to each other in the first lens array and the second lens array.

2. The lighting device according to claim 1,
   the concave surface including a spherical surface.

3. The lighting device according to claim 1,
   the concave surface being formed on a light-emission surface of the concave lens.

4. The lighting device according to claim 1,
   the plural small lenses in the first lens array being formed on a light-emission surface of the first lens array; and
   the concave surface being formed on a light-incident surface of the first lens array.

5. The lighting device according to claim 1,
   a second concave lens being disposed between the concave lens and the first lens array; and
   the concave surface being formed on at least one of a light-incident surface and a light-emission surface of the second concave lens.

6. A projector, comprising:
   the lighting device according to claim 1
   an electro-optic modulating device to modulate an illuminating luminous flux from the lighting device according to image information; and
   a projection optical system to project modulated light from said electro-optic modulating device.

7. The projector according to claim 6,
the concave surface including a spherical surface.

8. The projector according to claim 6,
the concave surface being formed on a light-emission surface of the concave lens.

9. The projector according to claim 6,
the plural small lenses of the first lens array being formed on a light-emission surface of the first lens array; and
the concave surface being formed on a light-incident surface of the first lens array.

10. The projector according to claim 6,
a second concave lens being disposed between the concave lens and the first lens array; and
the concave surface being formed on at least one of a light-incident surface and a light-emission surface of the second concave lens.

* * * * *